UNITED STATES PATENT OFFICE.

WILHELM PICKHARDT, OF NEW YORK, AND HERMANN ENDEMANN, OF BROOKLYN, ASSIGNORS TO SAID PICKHARDT AND ADOLF KUTTROFF, OF NEW YORK, N. Y.

PREPARATION OF CHINOLINE.

SPECIFICATION forming part of Letters Patent No. 252,847, dated January 24, 1882.

Application filed December 6, 1881. (Specimens.)

To all whom it may concern:

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound which is obtained by the action of sulphuric acid on chinoline.

In carrying out our invention we take the artificial chinoline of Skraup, or we prepare such artificial chinoline according to the Patent No. 241,738, granted to Zdenko H. Skraup, May 17, 1881, and then we free the same from the impurities mixed therewith by treating it with tartaric acid, whereby a tartrate of chinoline is obtained, and then liberating from this salt the chinoline by treating its aqueous solution with caustic alkalies, as fully described in another application for a patent bearing even date with this. After the chinoline has been freed from impurities we dissolve one hundred and twenty-nine parts, by weight, of chinoline, in three times its weight of alcohol of ninety-five per cent. by volume. To this solution ninety-eight parts of pure sulphuric acid of 1.848 specific gravity are added, after having been mixed with a small quantity of water to prevent subsequent formation of a sulpho-acid with the alcohol used as solvent for the chinoline. By the action of the sulphuric acid the solution becomes hot, and it deposits on cooling the sulphate of chinoline in white crystals, which are separated from the mother-liquor by placing them on a filter, washing with alcohol, and drying. The sulphate of chinoline is easily soluble in water, and its aqueous solution gives the reactions of chinoline and sulphuric acid. For instance, by the addition of caustic alkalies the chinoline is liberated, and when freed from the liquid such chinoline forms a colorless oily liquid, which assumes no color on being exposed to the light.

Our sulphate of chinoline can be used with great advantage for medical purposes.

What we claim as new, and desire to secure by Letters Patent, is—

As a new article of manufacture, the sulphate of chinoline herein described and having the characteristics above stated.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.